(12) United States Patent
Krull et al.

(10) Patent No.: US 7,409,288 B1
(45) Date of Patent: *Aug. 5, 2008

(54) PORTABLE NAVIGATION SYSTEM AND DEVICE WITH AUDIBLE TURN INSTRUCTIONS

(75) Inventors: Jay Dee Krull, Olathe, KS (US); Michael Childs, Olathe, KS (US); Scott M. Burgett, Overland Park, KS (US); Thomas H. Walters, Gardner, KS (US)

(73) Assignee: Garmin Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/181,305

(22) Filed: Jul. 14, 2005

Related U.S. Application Data

(60) Continuation of application No. 10/763,724, filed on Jan. 23, 2004, now Pat. No. 7,062,378, which is a continuation of application No. 10/365,171, filed on Feb. 11, 2003, now Pat. No. 6,856,899, which is a division of application No. 10/028,057, filed on Dec. 20, 2001, now Pat. No. 6,545,637.

(51) Int. Cl.
    *G01C 21/34* (2006.01)
(52) U.S. Cl. .................... 701/209; 701/213; 342/357.02
(58) Field of Classification Search ......... 701/200–202, 701/207–211, 213–215; 342/357.12, 357.13, 342/357.06; 340/988, 995.1
    See application file for complete search history.

(56) References Cited

U.S. PATENT DOCUMENTS 3,660,812 A    5/1972  Inose et al.
3,883,847 A    5/1975  Frank
4,811,613 A    3/1989  Phillips et al.

(Continued)

FOREIGN PATENT DOCUMENTS

AT    209809 T    12/2002

(Continued)

OTHER PUBLICATIONS

U.S. Appl. No. 10/763,724, filed Jan. 23, 2004, Krull et al.

(Continued)

*Primary Examiner*—Yonel Beaulieu
(74) *Attorney, Agent, or Firm*—Kevin E. West; Samuel M. Korte

(57) ABSTRACT

Systems, devices and methods are provided for an improved navigational route planning device which provides more understandable, accurate and timely route calculation capabilities. The navigational aid device with route calculation capabilities includes a processor connected to a memory. The memory includes cartographic data and a desired destination, the cartographic data including data indicative of thoroughfares of a plurality of types. A display is connected to the processor and is capable of displaying the cartographic data. The device is adapted to calculate a route to navigate to the desired destination. And, the device is adapted to adjust a starting point for the route calculation to an appropriate location such that the device is on the route at a time when the route calculation is completed. The device processes travel along the route, recognizes when the device has deviated from the route, and calculates a new route to navigate to the desired destination.

13 Claims, 8 Drawing Sheets

U.S. PATENT DOCUMENTS

| | | | |
|---|---|---|---|
| 4,827,419 A | 5/1989 | Selby, III | |
| 4,831,563 A | 5/1989 | Ando et al. | |
| 4,924,402 A | 5/1990 | Ando et al. | |
| 4,926,336 A | 5/1990 | Yamada | |
| 4,937,753 A | 6/1990 | Yamada | |
| 5,208,593 A | 5/1993 | Tong et al. | |
| 5,220,509 A | 6/1993 | Takemura et al. | |
| 5,243,529 A | 9/1993 | Kashiwazaki | |
| 5,272,638 A | 12/1993 | Martin et al. | |
| 5,291,414 A | 3/1994 | Tamai et al. | 364/449 |
| 5,297,051 A | 3/1994 | Arakawa et al. | |
| 5,331,563 A | 7/1994 | Masumoto et al. | |
| 5,343,399 A | 8/1994 | Yokoyama et al. | |
| 5,349,530 A | 9/1994 | Odagawa | |
| 5,363,306 A | 11/1994 | Kuwahara et al. | |
| 5,365,448 A | 11/1994 | Nobe et al. | |
| 5,371,497 A | 12/1994 | Nimura et al. | |
| 5,396,430 A | 3/1995 | Arakawa et al. | |
| 5,410,486 A | 4/1995 | Kishi et al. | |
| 5,422,815 A | 6/1995 | Hijikata | |
| 5,424,953 A | 6/1995 | Masumoto et al. | |
| 5,442,559 A | 8/1995 | Kuwahara et al. | |
| 5,452,212 A | 9/1995 | Yokoyama et al. | |
| 5,452,217 A | 9/1995 | Kishi et al. | |
| 5,463,554 A | 10/1995 | Araki et al. | |
| 5,475,599 A | 12/1995 | Yokoyama et al. | |
| 5,506,578 A | 4/1996 | Kishi et al. | |
| 5,506,774 A | 4/1996 | Nobe et al. | |
| 5,528,248 A | 6/1996 | Steiner et al. | |
| 5,537,323 A | 7/1996 | Schulte | |
| 5,537,324 A | 7/1996 | Nimura et al. | |
| 5,546,107 A | 8/1996 | Deretsky et al. | |
| 5,559,511 A | 9/1996 | Ito et al. | |
| 5,627,547 A | 5/1997 | Ramaswamy et al. | |
| 5,638,279 A | 6/1997 | Kishi et al. | |
| 5,652,706 A | 7/1997 | Morimoto et al. | |
| 5,657,231 A | 8/1997 | Nobe et al. | |
| 5,659,476 A | 8/1997 | LeFebvre et al. | |
| 5,682,525 A | 10/1997 | Bouve et al. | |
| 5,712,788 A | 1/1998 | Liaw et al. | |
| 5,729,109 A | 3/1998 | Kaneko et al. | |
| 5,729,458 A | 3/1998 | Poppen | |
| 5,739,772 A | 4/1998 | Nanba et al. | |
| 5,742,925 A | 4/1998 | Baba | |
| 5,757,289 A | 5/1998 | Nimura et al. | |
| 5,757,359 A * | 5/1998 | Morimoto et al. | 345/156 |
| 5,774,073 A | 6/1998 | Maekawa et al. | |
| 5,774,828 A | 6/1998 | Brunts et al. | |
| 5,787,383 A | 7/1998 | Moroto et al. | |
| 5,793,631 A | 8/1998 | Ito | |
| 5,809,447 A | 9/1998 | Kato et al. | |
| 5,821,887 A | 10/1998 | Zhu | |
| 5,845,282 A | 12/1998 | Alley et al. | |
| 5,852,791 A | 12/1998 | Sato et al. | |
| 5,857,196 A | 1/1999 | Angle et al. | |
| 5,862,511 A | 1/1999 | Croyle et al. | |
| 5,874,905 A | 2/1999 | Nanba et al. | |
| 5,877,751 A | 3/1999 | Kanemitsu et al. | |
| 5,878,368 A | 3/1999 | DeGraaf | |
| 5,887,269 A | 3/1999 | Brunts et al. | |
| 5,890,092 A | 3/1999 | Kato et al. | |
| 5,893,081 A | 4/1999 | Poppen | |
| 5,902,349 A | 5/1999 | Endo et al. | |
| 5,911,773 A | 6/1999 | Mutsuga et al. | |
| 5,925,090 A | 7/1999 | Poonsaengsathit | |
| 5,926,118 A | 7/1999 | Hayashida et al. | |
| 5,938,721 A | 8/1999 | Dussell et al. | |
| 5,946,687 A | 8/1999 | Gehani et al. | |
| 5,946,692 A | 8/1999 | Faloutsos et al. | |
| 5,951,622 A | 9/1999 | Nomura | |
| 5,953,722 A | 9/1999 | Lampert et al. | |
| 5,964,821 A | 10/1999 | Brunts et al. | |
| 5,968,109 A | 10/1999 | Israni et al. | |
| 5,977,885 A | 11/1999 | Watanabe | |
| 5,978,730 A | 11/1999 | Poppen et al. | |
| 5,987,377 A | 11/1999 | Westerlage et al. | |
| 5,995,970 A | 11/1999 | Robinson et al. | |
| 6,016,485 A | 1/2000 | Amakawa et al. | |
| 6,021,406 A | 2/2000 | Kuznetsov | |
| 6,023,655 A | 2/2000 | Nomura | |
| 6,032,219 A | 2/2000 | Robinson et al. | |
| 6,035,299 A | 3/2000 | White et al. | |
| 6,038,509 A | 3/2000 | Poppen et al. | |
| 6,038,559 A | 3/2000 | Ashby et al. | |
| 6,040,824 A | 3/2000 | Maekawa et al. | |
| 6,047,280 A | 4/2000 | Ashby et al. | |
| 6,052,645 A | 4/2000 | Harada | |
| 6,061,003 A | 5/2000 | Harada | |
| 6,061,630 A | 5/2000 | Walgers et al. | |
| 6,064,941 A | 5/2000 | Nimura et al. | |
| 6,073,076 A | 6/2000 | Crowley et al. | |
| 6,076,041 A | 6/2000 | Watanabe | |
| 6,081,803 A | 6/2000 | Ashby et al. | |
| 6,088,652 A | 7/2000 | Abe | |
| 6,101,443 A | 8/2000 | Kato et al. | |
| 6,108,603 A | 8/2000 | Karunanidhi | |
| 6,108,604 A | 8/2000 | Fukaya et al. | |
| 6,112,153 A | 8/2000 | Schaaf et al. | |
| 6,112,200 A | 8/2000 | Livshutz et al. | |
| 6,119,066 A | 9/2000 | Sugiura et al. | |
| 6,121,314 A | 9/2000 | Richter et al. | |
| 6,121,900 A | 9/2000 | Takishita | |
| 6,122,593 A | 9/2000 | Friederich et al. | |
| 6,128,515 A | 10/2000 | Kabler et al. | |
| 6,128,573 A | 10/2000 | Nomura | |
| 6,132,391 A | 10/2000 | Onari et al. | |
| 6,134,501 A | 10/2000 | Oumi | |
| 6,144,917 A | 11/2000 | Walters et al. | |
| 6,151,552 A | 11/2000 | Koizumi et al. | |
| 6,161,092 A | 12/2000 | Latshaw et al. | |
| 6,169,956 B1 | 1/2001 | Morimoto et al. | |
| 6,172,641 B1 | 1/2001 | Millington | |
| 6,182,006 B1 | 1/2001 | Meek | |
| 6,182,010 B1 | 1/2001 | Berstis | |
| 6,184,823 B1 | 2/2001 | Smith et al. | |
| 6,188,955 B1 | 2/2001 | Robinson et al. | |
| 6,192,314 B1 | 2/2001 | Khavakh et al. | |
| 6,199,013 B1 | 3/2001 | O'Shea | |
| 6,199,045 B1 | 3/2001 | Giniger et al. | |
| 6,202,024 B1 | 3/2001 | Yokoyama et al. | |
| 6,202,026 B1 | 3/2001 | Nimura et al. | |
| 6,219,457 B1 | 4/2001 | Potu | |
| 6,222,485 B1 | 4/2001 | Walters et al. | |
| 6,226,591 B1 | 5/2001 | Okumura et al. | |
| 6,249,740 B1 | 6/2001 | Ito et al. | |
| 6,249,744 B1 | 6/2001 | Morita | |
| 6,252,605 B1 | 6/2001 | Beesley et al. | |
| 6,256,351 B1 | 7/2001 | Hong | |
| 6,259,988 B1 | 7/2001 | Galkowski et al. | |
| 6,263,276 B1 | 7/2001 | Yokoyama et al. | |
| 6,263,277 B1 | 7/2001 | Tanimoto et al. | |
| 6,266,612 B1 | 7/2001 | Dussell et al. | |
| 6,266,615 B1 | 7/2001 | Jin | |
| 6,278,994 B1 | 8/2001 | Fuh et al. | |
| 6,285,950 B1 | 9/2001 | Tanimoto | |
| 6,285,951 B1 | 9/2001 | Gaskins et al. | |
| 6,292,743 B1 | 9/2001 | Pu et al. | |
| 6,298,303 B1 | 10/2001 | Khavakh et al. | |
| 6,298,305 B1 | 10/2001 | Kadaba et al. | |
| 6,307,573 B1 | 10/2001 | Barros | |
| 6,308,177 B1 | 10/2001 | Israni et al. | |
| 6,314,365 B1 | 11/2001 | Smith | |
| 6,317,684 B1 | 11/2001 | Roeseler et al. | |
| 6,317,687 B1 | 11/2001 | Morimoto et al. | |

| | | |
|---|---|---|
| 6,321,158 B1 | 11/2001 | DeLorme et al. |
| 6,324,467 B1 | 11/2001 | Machii et al. |
| 6,347,278 B2 | 2/2002 | Ito |
| 6,349,257 B1 | 2/2002 | Liu et al. |
| 6,360,167 B1 | 3/2002 | Millington et al. |
| 6,362,778 B2 | 3/2002 | Neher |
| 6,374,177 B1 | 4/2002 | Lee et al. |
| 6,374,179 B1 | 4/2002 | Smith et al. |
| 6,381,535 B1 | 4/2002 | Durocher et al. |
| 6,388,877 B1 | 5/2002 | Canova, Jr. et al. |
| 6,393,149 B2 | 5/2002 | Friederich et al. |
| 6,401,034 B1 | 6/2002 | Kaplan et al. |
| 6,401,035 B2 | 6/2002 | Jin |
| 6,405,123 B1 | 6/2002 | Rennard et al. |
| 6,411,899 B2 | 6/2002 | Dussell et al. |
| 6,427,119 B1 | 7/2002 | Stefan et al. |
| 6,430,498 B1 | 8/2002 | Maruyama et al. |
| 6,456,234 B1 | 9/2002 | Johnson |
| 6,456,938 B1 | 9/2002 | Barnard |
| 6,459,987 B1 | 10/2002 | Krull et al. |
| 6,460,046 B1 | 10/2002 | Meek |
| 6,477,464 B2 | 11/2002 | McCarthy et al. |
| 6,477,526 B2 | 11/2002 | Hayashi et al. |
| 6,484,093 B1 | 11/2002 | Ito et al. |
| 6,487,494 B2 | 11/2002 | Odinak et al. |
| 6,504,496 B1 | 1/2003 | Mesarovic et al. |
| 6,505,123 B1 | 1/2003 | Root et al. |
| 6,510,379 B1 | 1/2003 | Hasegawa et al. |
| 6,512,525 B1 | 1/2003 | Capps et al. |
| 6,522,875 B1 | 2/2003 | Dowling et al. |
| 6,525,768 B2 | 2/2003 | Obradovich .......... 348/231.99 |
| 6,526,351 B2 | 2/2003 | Whitham |
| 6,532,152 B1 | 3/2003 | White et al. |
| 6,535,743 B1 | 3/2003 | Kennedy et al. |
| 6,542,814 B2 | 4/2003 | Polidi et al. |
| 6,545,637 B1* | 4/2003 | Krull et al. ............. 342/357.09 |
| 6,563,440 B1 | 5/2003 | Kangas |
| 6,567,743 B1 | 5/2003 | Mueller et al. |
| 6,574,553 B1 | 6/2003 | Beesley et al. |
| 6,574,554 B1 | 6/2003 | Beesley et al. |
| 6,581,003 B1 | 6/2003 | Childs et al. |
| 6,594,666 B1 | 7/2003 | Biswas et al. |
| 6,615,130 B2 | 9/2003 | Myr |
| 6,615,131 B1 | 9/2003 | Rennard et al. |
| 6,633,809 B1 | 10/2003 | Aizono et al. |
| 6,647,337 B1 | 11/2003 | Childs et al. |
| 6,650,996 B1 | 11/2003 | Beesley et al. |
| 6,650,997 B2 | 11/2003 | Funk |
| 6,674,445 B1 | 1/2004 | Chithambaram et al. |
| 6,674,849 B1 | 1/2004 | Froeberg |
| 6,675,093 B1 | 1/2004 | Childs et al. |
| 6,681,176 B2 | 1/2004 | Funk et al. |
| 6,687,615 B1 | 2/2004 | Krull et al. |
| 6,694,256 B1 | 2/2004 | Childs et al. |
| 6,704,645 B1 | 3/2004 | Beesley et al. |
| 6,708,112 B1 | 3/2004 | Beesley et al. |
| 6,725,155 B1 | 4/2004 | Takahashi et al. |
| 6,768,942 B1 | 7/2004 | Chojnacki |
| 6,775,612 B1 | 8/2004 | Kao et al. |
| 6,782,318 B1 | 8/2004 | Beesley et al. |
| 6,789,012 B1 | 9/2004 | Childs et al. |
| 6,799,115 B1 | 9/2004 | Childs et al. |
| 6,807,483 B1 | 10/2004 | Chao et al. |
| 6,823,256 B1 | 11/2004 | Burt |
| 6,834,230 B1 | 12/2004 | Childs et al. |
| 6,839,624 B1 | 1/2005 | Beesley et al. |
| 6,845,322 B1 | 1/2005 | Chao et al. |
| 6,847,884 B1 | 1/2005 | Childs et al. |
| 6,847,890 B1 | 1/2005 | Childs et al. |
| 6,850,842 B2 | 2/2005 | Park |
| 6,856,893 B2 | 2/2005 | Beesley et al. |
| 6,856,899 B2 | 2/2005 | Krull et al. |
| 6,856,900 B1 | 2/2005 | Childs et al. |
| 6,889,138 B1 | 5/2005 | Krull et al. |
| 6,892,135 B1 | 5/2005 | Krull et al. |
| 6,898,520 B2 | 5/2005 | Kao et al. |
| 6,909,965 B1 | 6/2005 | Beesley et al. |
| 6,947,838 B1 | 9/2005 | Krull et al. |
| 6,948,043 B2 | 9/2005 | Barr et al. |
| 6,975,940 B1 | 12/2005 | Childs et al. |
| 6,980,906 B2 | 12/2005 | Kao et al. |
| 6,987,986 B1 | 1/2006 | Boesen |
| 6,999,873 B1 | 2/2006 | Krull et al. |
| 7,043,362 B2 | 5/2006 | Krull et al. |
| 7,062,378 B2* | 6/2006 | Krull et al. .................. 701/209 |
| 7,120,539 B2 | 10/2006 | Krull |
| 7,184,886 B1 | 2/2007 | Krull et al. |
| 2001/0043745 A1 | 11/2001 | Frederich et al. |
| 2001/0045949 A1 | 11/2001 | Chithambaram et al. |
| 2001/0047242 A1 | 11/2001 | Ohta |
| 2001/0056327 A1 | 12/2001 | Jin |
| 2002/0038316 A1 | 3/2002 | Onyon et al. |
| 2002/0040271 A1 | 4/2002 | Park et al. |
| 2002/0065603 A1 | 5/2002 | Watanabe et al. |
| 2002/0068583 A1 | 6/2002 | Murray |
| 2002/0091527 A1 | 7/2002 | Shiau |
| 2002/0102988 A1 | 8/2002 | Myllymaki |
| 2002/0120753 A1 | 8/2002 | Levanon et al. |
| 2002/0164998 A1 | 11/2002 | Younis |
| 2002/0169549 A1 | 11/2002 | Kaplan |
| 2002/0169778 A1 | 11/2002 | Natesan et al. |
| 2002/0173905 A1 | 11/2002 | Jin |
| 2003/0006913 A1 | 1/2003 | Joyce et al. |
| 2003/0006918 A1 | 1/2003 | Barnett |
| 2003/0013483 A1 | 1/2003 | Ausems et al. |
| 2003/0033176 A1 | 2/2003 | Hancock |
| 2003/0045301 A1 | 3/2003 | Wollrab |
| 2003/0045998 A1 | 3/2003 | Medl |
| 2003/0048599 A1 | 3/2003 | Martin |
| 2003/0069029 A1 | 4/2003 | Dowling et al. |
| 2003/0069899 A1 | 4/2003 | Brown et al. |
| 2003/0105845 A1 | 6/2003 | Leermakers |
| 2003/0124974 A1 | 7/2003 | Asami |
| 2003/0131023 A1 | 7/2003 | Bassett et al. |
| 2003/0131059 A1 | 7/2003 | Brown et al. |
| 2003/0139150 A1 | 7/2003 | Rodriguez et al. |
| 2003/0172044 A1 | 9/2003 | ShamRao |
| 2004/0192329 A1 | 9/2004 | Barbosa et al. |
| 2004/0220726 A1 | 11/2004 | Jin |
| 2005/0089213 A1 | 4/2005 | Geng |

FOREIGN PATENT DOCUMENTS

| | | |
|---|---|---|
| CN | 1391687 T | 10/2003 |
| EP | 0061674 | 6/1982 |
| EP | 0123562 | 4/1984 |
| EP | 0242099 | 10/1987 |
| FR | 2541801 | 2/1983 |
| FR | 2818414 | 6/2002 |
| JP | 08-221694 | 8/1996 |
| JP | 10-132594 | 5/1998 |
| WO | 01/23839 | 4/2001 |
| WO | 02/060157 | 11/2003 |
| WO | 01/61276 | 3/2004 |
| WO | 02/103291 | 3/2004 |
| WO | 03/058170 | 10/2004 |

OTHER PUBLICATIONS http://hertzneverlost.com/index.php.
http://hertzneverlost.com/basic.php.
http://hertzneverlost.com/reference.php.
http://www.autonav2000.com/Products/750NavPlus.htm.
http://www.autonav2000.com/Products/750M-Plus.htm.
http://www.autonav2000.com/Products/750Plus.htm.
U.S. Appl. No. 10/032,250, filed Dec 21, 2001, Childs et al.
U.S. Appl. No. 10/086,370, filed Feb. 18, 2002, Childs et al.

U.S. Appl. No. 10/269,573, filed Oct. 11,2002, Childs et al.
U.S. Appl. No. 11/035,243, filed Nov. 05, 2003, Krull et al.
U.S. Appl. No. 10/962,700, filed Oct. 12, 2004, Childs et al.
U.S. Appl. No. 10/976,998, filed Oct. 29, 2004, Childs et al.
U.S. Appl. No. 10/993,189, filed Nov. 19, 2004, Childs et al.
U.S. Appl. No. 10/993,174, filed Nov. 19, 2004, Krull et al.
U.S. Appl. No. 11/035,242, filed Jan. 19, 2004, Beesley et al.
"An optimal pathfinder for vehicles in real-world digital terrain maps", http://www.nease.net/jamsoft/shortestpath/pathfinder/4.html, 11 pages, (1999).
"Informed Search Methods", Artificial Intelligence, A Modern Approach, Prentice Hall, Inc., pp. 92-115, (1995).
"Real-Time Vehicle Routing in Dynamic and Stochastic Urban Traffic Networks", http://www.gpu.srv.ualberta.ca/lfu/research.htm, pp. 1-3, (1997).
Ahuja, R., et al., "Faster Algorithms for the Shortest Path Problem", Journal of the Association for Computing Machinery, 37(2), pp. 213-223, (1990).
Booten, A., "The Automatic Position Reporting System", http:/www.oarc.net/aprs.htm, 5 pages, (2002).
Bourrie, S. "Tendler Updates FoneFinder", Wireless Week, p. 24, Jun. 28, 1999.
Bravman, J.S. et al., "Automatic Vehicle Monitoring", 10 pages (published prior to Oct. 11, 2002).
Chung et al.; Level-Compressed Huffman Decoding; IEEE-Transactions on Communication; Oct. 1999; vol. 47, No. 10; pp. 1455-1457.
Cung, V., et al. "An Efficient Implementation of Parallel A", CFPAR, Montreal, Canada, pp. 153-167, (1994).
Fredman, M., et al., "Fibonacci heaps and their uses in improved network optimization algorithms", Journal of the ACM, 34(3), 2 pages, (1987).
Fu, L., "Heuristic Shortest Path Algorithms and their Potential IVHS Applications", Proceedings of the Fourth University of Alberta--University of Calgary, Joint Graduate Student Symposium in Transportation Engineering, pp. 83-109, (1995).
Ikeda, T., et al., "A Fast Algorithm for Finding Better Routes by AI Search Techniques", Vehicle Navigation and Information Systems Conference Proceedings, pp. 291-296, (1994).
Kaindl, H., et al., "Memory-Bounded Bidirectional Search", Proceedings of the 12th National Conference on Art, AAAI press, Seattle, WA, pp. 1359-1364, (1994).
Laporte, G., "The Vehicle Routing Problem: An Overview of exact and approximate algorithms", European Journal of Operational Research, 59, pp. 345-358, (1992).
Microsoft Press Computer Dictionary, Third Edition, Microsoft Press, p. 281 (1997).

Myers ,B., "Data Structures for Best-First Search", http://www4.ncsu.edu/jbmyers/dsai.htm, pp. 1-6, (1997).
Nardelli et al., "Time and Space Efficient Secondary Memory Representation of Quadtrees." Information Systems, vol. 22, No. 1, Elsevier Science Ltd. 1997, pp. 25-37.
Nekritch, Y.; Byte-oriented decoding of canonical Huffman Codes; IEEE-Information Theory 2000; Jun. 2000; 0. 371.
Nilsen, P., "Application of the Global-Positioning System (GPS) to Automatic Vehicle Monitoring", 1981 Carnahan Conference on Crime Countermeasures, University of Kentucky, pp. 7-11, (1981).
Oberhauser et al.; Fast data structures for shortest path routing: a comparative evaluation; 1995 IEEE International Conference on Gateway to Globalization; Jun. 1995; vol. 3, pp. 1597-1601.
Ronngren, R., et al., "Parallel and Sequential Priority Queue Algorithms", ACM Transactions on Modeling and Computer Simulation, 7 (2), pp. 168-172, 198, 199, (1997).
Rosenberg, J. M. Dictionary of Computers, Information Processing and Telecommunications; Second Edition, Aug. 1990.
Stout, B., "Smart Moves: Intelligent Pathfinding", Gamasutra, http://www.gamasutra.com/features/programming/080197/pathfinding.htm, pp. 1-11, (1997).
Tousidou et al., "A performance Comparison of Quadtree-based Access Methods for Thematic Maps." Proceedings of the 2000 ACM symposium on Applied Computing, vol. 1, ACM Press, 2000, pp. 381-388.
Wai, L., et al., "Camparative Study of Shortest Path Algorithm for Transport Network", USRP Report 2, http://www.comp.nus.edu.sg/, leonghoe/USRPreport-txt.html, pp. 1-10, (1999).
Zhan, F.B., "Three Fastest Shortest Path Algorithms on Real Road Networks: Data Structures and Procedures", Journal of Geographic Information and Decision Analysis, 1 (1), http://www.geog.uwo.ca/gimda/journal/vol1.1/Zhan/Zhan.htm, 11 pages, (1997).
Zhao, Y., "Vehicle Location and Navigation Systems", Artech House, Norwood, Massachusetts, (1997).
Zhao, Y., et al., "An Adaptive Route-Guidance Algorithm for Intelligent Vehicle Highway Systems", American Control Conference, Boston, MA, Department of Electrical Engineering and Computer Science, The University of Michigan, pp. 2568-2573, (1991).
DATUS RouteFinder PNA publication, 2 pages, 1997.
Sanyo Gorilla NV-21 Manual Translation, 46 pages, 1997.
Garmin StreetPilot GPS Owner's Manual and Reference Guide, 88 pages, Jun. 2000.
Ultradata Systems Travel*Star 24 GPS Auto Navigational System, SEC 10-K Filing, 5 pages, Dec. 31, 2000.

* cited by examiner

PORTABLE NAVIGATION SYSTEM AND DEVICE WITH AUDIBLE TURN INSTRUCTIONS

RELATED APPLICATION

This application is a continuation of U.S. application Ser. No. 10/763,724, filed Jan. 23, 2004, which is a continuation of U.S. application Ser. No. 10/365,171, filed Feb. 11, 2003, now U.S. Pat. No. 6,856,899 which is a divisional of U.S. application Ser. No. 10/028,057, filed Dec. 20, 2001, now U.S. Pat. No. 6,545,637, all of which are incorporated hereby by reference.

FIELD OF THE INVENTION

The present invention relates generally to navigational devices, and in particular to navigational devices with improved route calculation capabilities.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One feature of increased system capability involves off-route recalculation capabilities. Many conventional navigational devices simply do not incorporate an off-route recalculation functionality in order to reduce system complexity and maintain a low overall system cost. Some of these devices may alert the user that they are off course, but they do not perform any course recalculation. In these devices, the user must halt their journey or attempt to relocate themselves on the prior planned route via traditional navigation methods, e.g. asking directions or using a conventional map. With some devices, the user may still be able to see the previously planned route, but the user will have to employ his or her own decision making to chart back onto the displayed route. This can be time consuming and provide frustration to a user who is likely unfamiliar with the routes surrounding their errant location.

Additionally, in order to calculate a route it is necessary to select a starting position to begin the route calculation. The route calculation algorithm invariably takes a small but finite amount of time, maybe on the order of 10 to 20 seconds. If the current position of the device is used as the starting position for the route calculation, a new route is generated based on the position that was known historically. Thus, a moving device will have traveled some distance beyond that historical position. In other words, the new route will have a starting point which corresponds to the historical position which may or may not correspond to the device's current position. Thus, if a turn or other maneuver is indicated as a function of getting from the historical position (as known at the time the calculation was started) to a given destination, the device will easily be beyond the turn that was generated by the route calculation algorithm.

While stopping travel during the route calculation process may solve the stated problem of generating a route while in motion, in many cases halting travel is not a viable alternative. For example, when the user is traveling on an interstate it is entirely impossible to simply stop. The alternative of pulling off on the shoulder of a road is undesirable and can be dangerous. Pulling off on an exit is equally undesirable since doing so increases travel time and provides an added inconvenience to the user. In other instances, such as navigating downtown city streets, the traffic issues alone may prevent the user from stopping his or her vehicle during the recalculation process. Even if the user has the ability to safely stop his or her vehicle, such as when traveling in a neighborhood, the inconvenience factor is present.

In summary, current prior art systems have created a spectrum of products in which the degree of navigational accuracy is dictated primarily by the cost of the system. The lower cost systems currently offer a low degree of accuracy that is often inadequate for users. Therefore, there exists a need for a navigational route planning device which is more efficient and accurate than current low cost systems, without requiring more expensive system resources. In addition, there is also a need for a navigational route planning device which provides a user with more understandable, accurate and timely route calculation capabilities.

SUMMARY OF THE INVENTION

The above mentioned problems of navigational devices are addressed by the present invention and will be understood by reading and studying the following specification. Systems and methods are provided for a navigational route planning device which is more efficient and accurate than current low cost systems, without requiring the more expensive system resources. The systems and methods of the present invention offer an improved navigational route planning device which provides a user with more understandable, accurate and timely route calculation capabilities.

In one embodiment of the present invention, an electronic navigational aid device with improved route calculation capabilities is provided. The navigational aid device includes a processor with a display connected to the processor. A memory is connected to the processor as well. The memory includes cartographic data and a route to a desired destination stored therein. The cartographic data includes data indicative of thoroughfares of a plurality of types. The device processes travel along the route. The device is capable of selecting an appropriate starting point for a route calculation and capable of recognizing when the device has deviated from a route. When the device is off-route, the device calculates a new route to navigate to the desired destination. In order to select an appropriate starting point for the route calculation or recalculation, the device adjusts a starting point for the new route to a location forward along a current thoroughfare on which the device is located or traveling such that the device is on the route at a time when the new route calculation is completed.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having route calculation capabilities. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
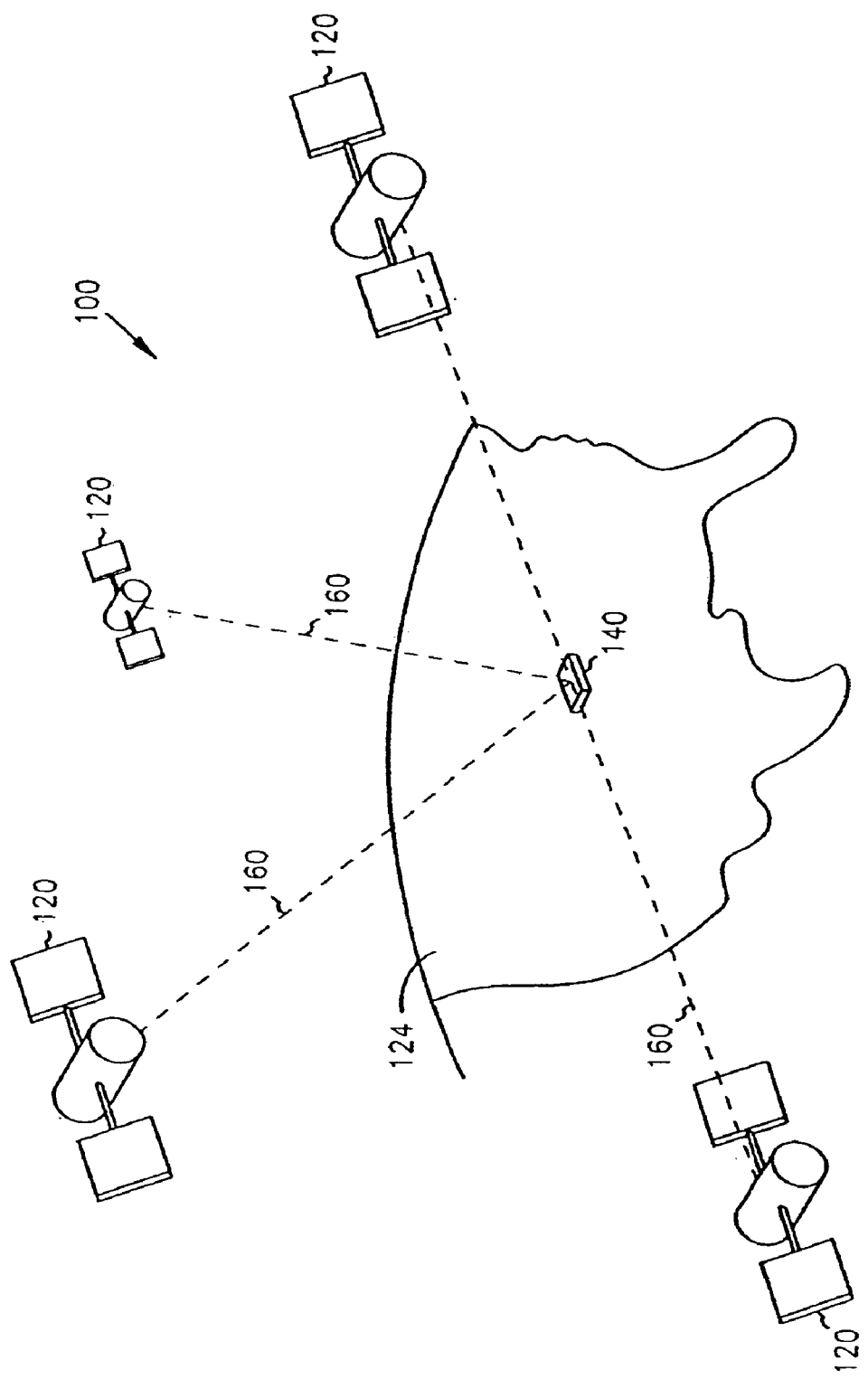
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
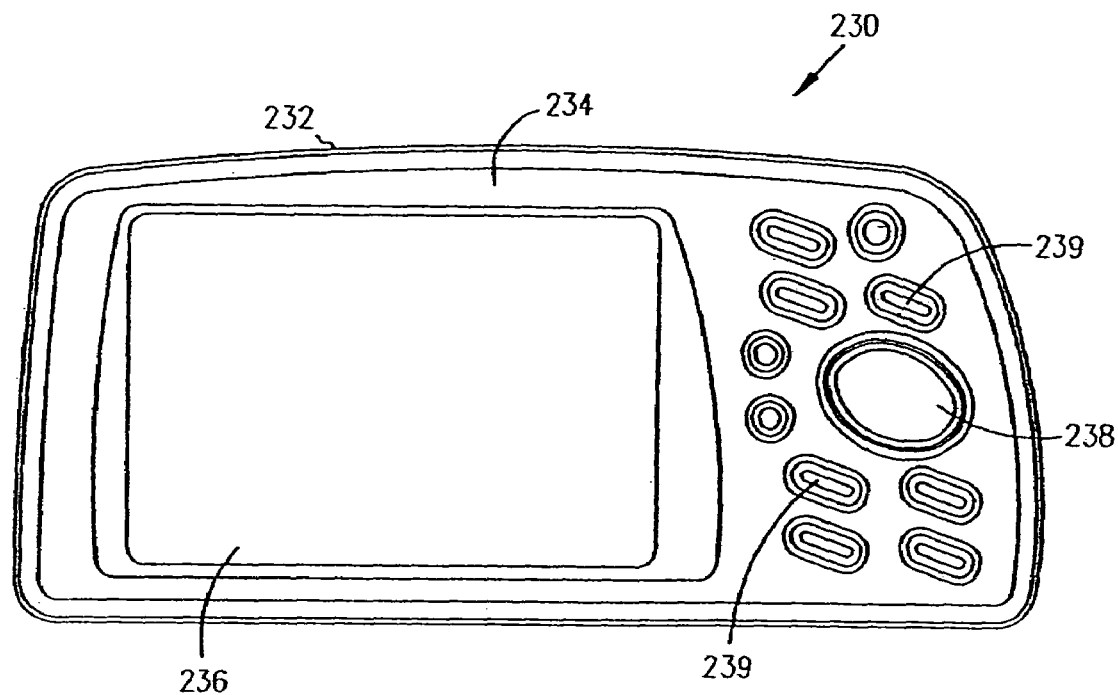
FIGS. 2A and 2B illustrate views for one embodiment of an electronic navigational device according to the teachings of the present invention.
Figure 2B:
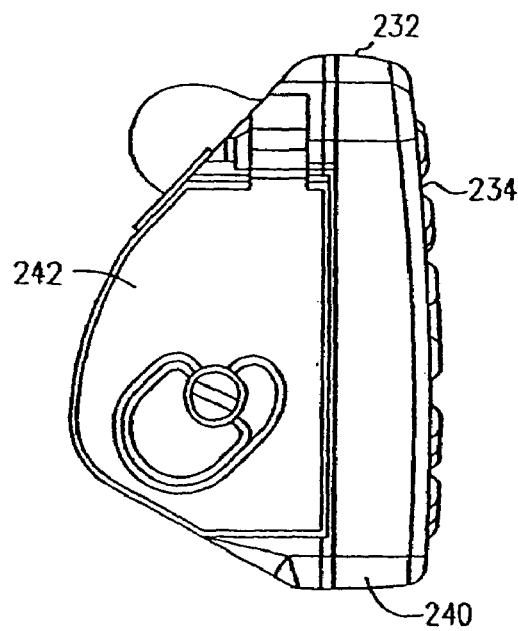

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

Figure 3A:
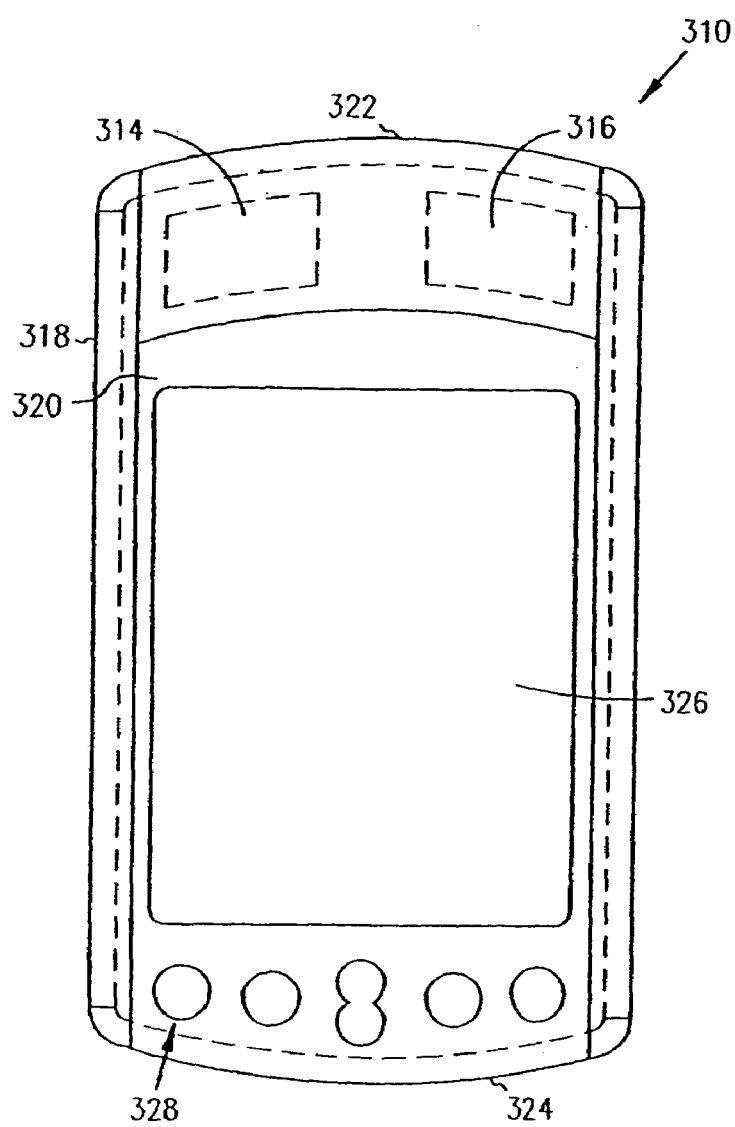
FIGS. 3A–3C illustrate views for another embodiment of an electronic navigational device according to the teachings of the present invention.
Figure 3B:
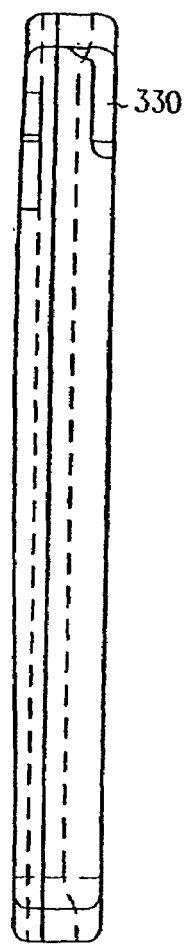
Figure 3C:
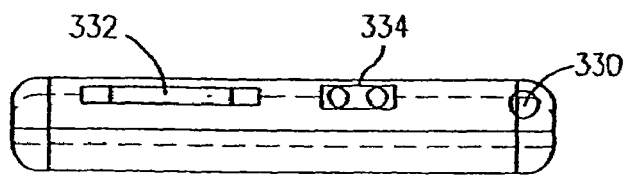

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
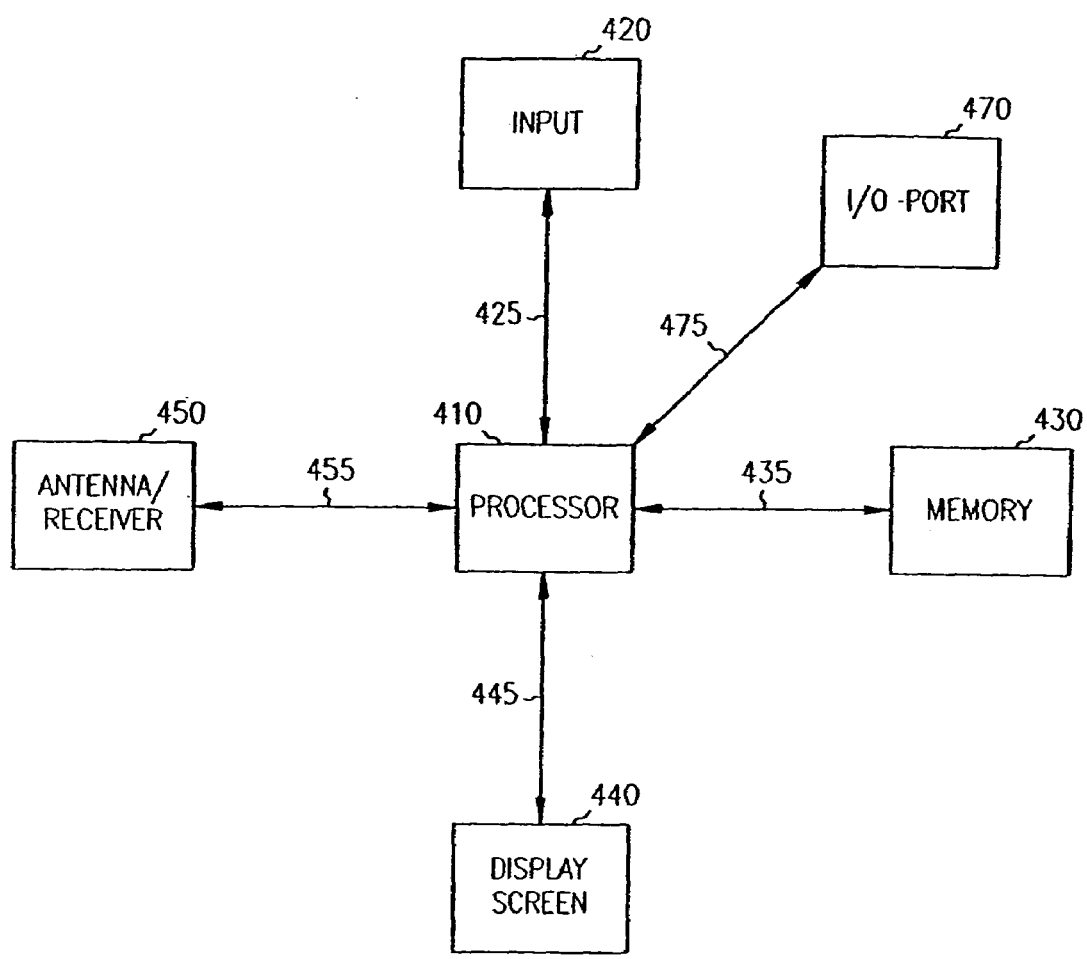
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 232 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475.

Figure 4B:
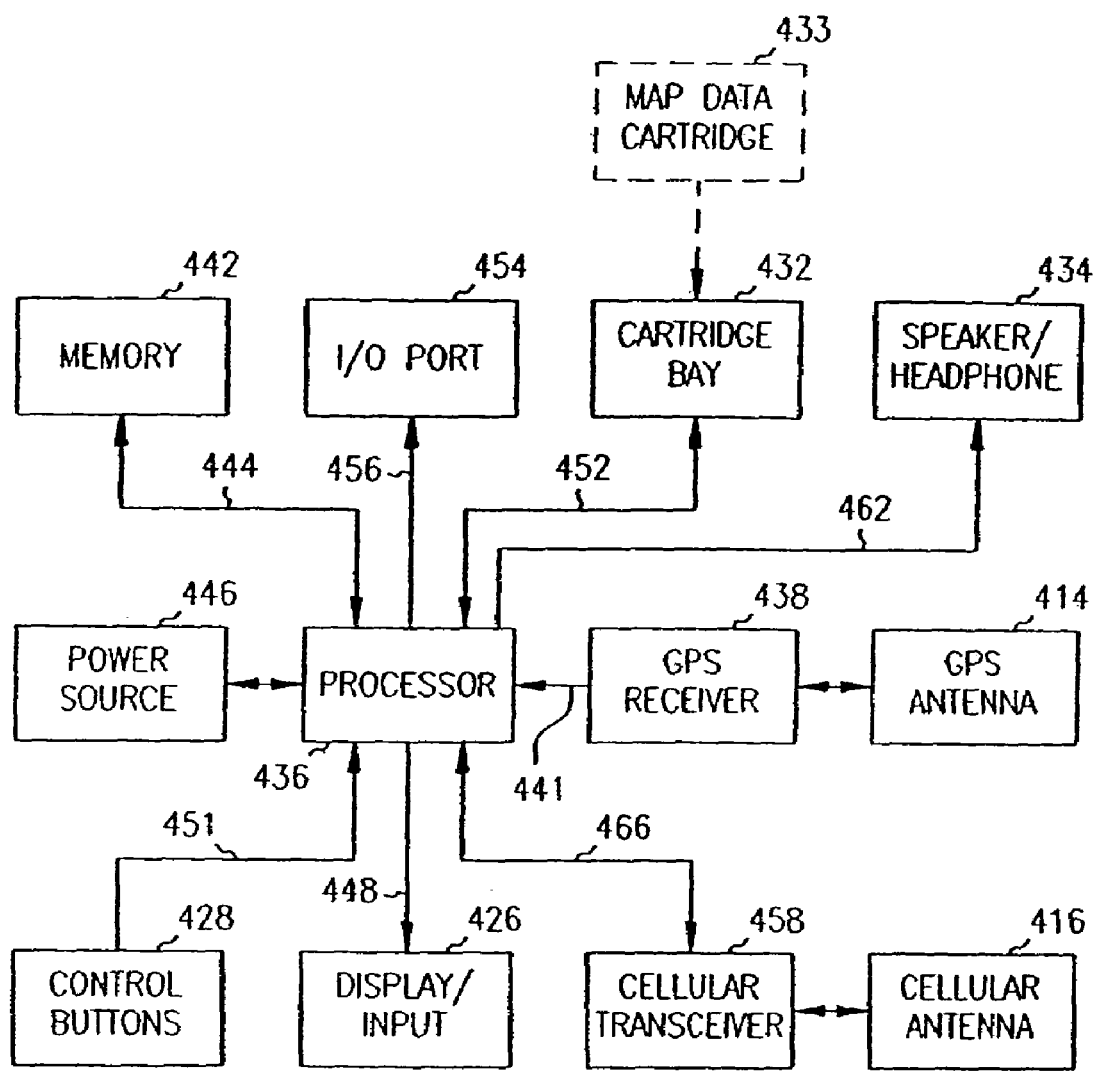
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

Using the processing algorithms of the present invention, the device selects an appropriate starting point for performing a new route calculation and the device recognizes when the device has deviated from the route stored in memory. The device then uses those electronic components to calculate a new route to navigate to the desired destination. According to the teachings of the present invention, the device adjusts a starting point for the new route calculation to a location forward along a current thoroughfare on which the device is located or traveling such that the location is at or forward of the device at a time when the new route calculation is completed. In other words, the device adjusts a starting point for the new route calculation to a location forward along a current thoroughfare on which the device is located or traveling such that the device is on the route at a time when the new route calculation is completed. According to the teachings of the present invention, the device incorporates these and other functions as will be explained in more detail below in connection with FIGS. 6 and 7.

Figure 5:
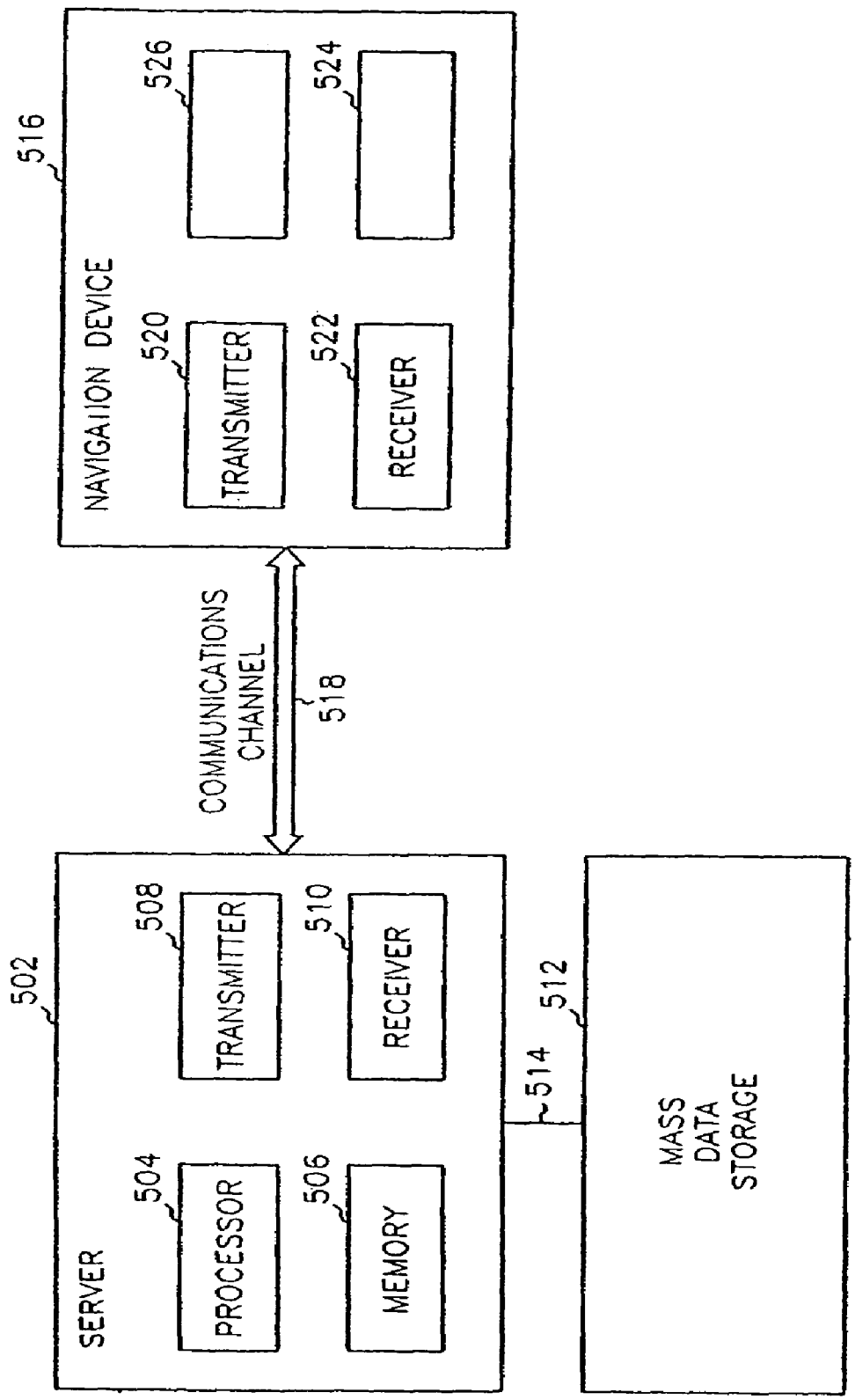
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory, as previously shown and described with respect to the block diagram of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure, the navigation system of FIG. 5 is adapted to the present invention in a manner distinguishable from that described and explained in detail in connection with FIGS. 4A and 4B.

That is, the navigational system 500 of FIG. 5 is likewise adapted to provide an electronic navigational aid device 516 with route calculation capabilities. In this embodiment, the processor 504 in the server 502 is used to handle the bulk of the system's processing needs. The mass storage device 512 connected to the server can include volumes more cartographic and route data than that which is able to be maintained on the navigational device 516 itself. In this embodiment, the server 502 processes the majority of a device's travel along the route using a set of processing algorithms and the cartographic and route data stored in memory 512 and can operate on signals, e.g. GPS signals, originally received by the navigational device 516. Similar to the navigational device of FIGS. 4A and 4B, the navigation device 516 in system 500 is outfitted with a display 524 and GPS capabilities 526.

As described and explained in detail in connection with FIGS. 4A and 4B, the navigation system of FIG. 5 uses processing algorithms select an appropriate starting point for performing a new route calculation. And, the system uses the processing algorithms to recognize when the device has deviated from the route and to perform a new route calculation. The system then uses the electronic components shown in FIG. 5 to select the appropriate starting point and calculate a new route for navigating the device 516 to the desired destination. As one of ordinary skill in the art will understand upon reading and comprehending this disclosure, a user of the navigation device 516 can be proximate to or accompanying the navigation device 516. The invention however, is not so limited.

According to the teachings of the present invention, the system adjusts a starting point for the new route calculation to a location forward along a current thoroughfare on which the device is located or traveling such that the location is at or forward of the device at a time when the new route calculation is completed. In other words, the device adjusts a starting point for the new route calculation to a location forward along a current thoroughfare on which the device is located or traveling such that the device is on the route at a time when the new route calculation is completed. The navigation device 516 of the present invention includes a portable electronic navigational aid device. In one embodiment, the portable electronic navigational aid device includes a personal digital assistant (PDA). In one embodiment, the portable electronic navigational aid device includes a wireless communications device.

The features and functionality explained and described in detail above in connection with the device of FIGS. 4A and 4B are likewise available in the system 500 of FIG. 5. That is, in one embodiment the navigation device 516 further provides audio and visual cues to aid the navigation along the route.

Figure 6:
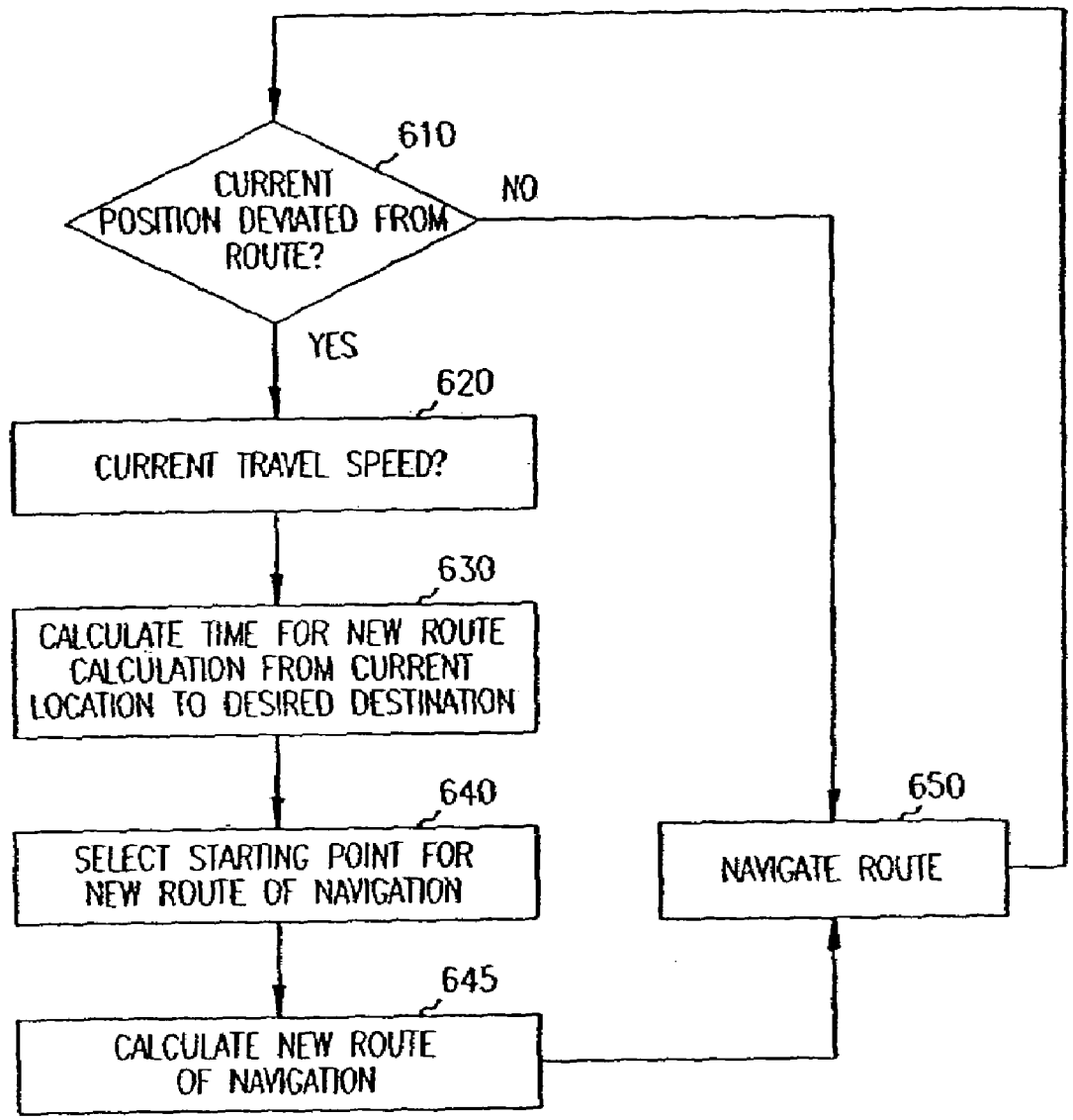
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method for performing a route calculation within a navigation device or navigation system as described and explained in detail above in connection with FIGS. 4A, 4B, and 5. And, as described above, a processor is used for processing signals which include input data from input devices, e.g. keypads, other input keys, or other inputs, GPS signals from GPS components, and data received from I/O ports in order to perform the methods described herein. In the embodiment shown in FIG.

6, the navigation aid method for performing a route calculation includes detecting when a navigation device has deviated from a first route of navigation and calculating the device's current location in block 610. The device's travel speed is calculated in block 620. A calculation time is determined for processing a second route of navigation from the device's current location to a desired destination in block 630. In one embodiment, the calculation time for processing a second route of navigation is estimated based on a distance from the device's current location to the desired destination. In one embodiment, the calculation time is estimated base on a complexity of the thoroughfares from the device's current location to the desired destination. In one embodiment, the calculation time for processing the second, or new route of navigation is determined as a time equal to or greater than an actual previous calculation time. Subsequently, in block 640, a starting point for the second route of navigation is selected based on the device's travel speed and the determined calculation time for processing the second, or new route. Once the second, or new route has been determined in block 645, the method proceeds to block 650 and navigates the route. As one of ordinary skill in the art will understand upon reading and comprehending this disclosure, the method embodiment described in FIG. 6 is repeatable, returning to block 610 in order to continually assess whether a then current position of the navigation device has deviated from the route.

In one embodiment of the present invention, detecting when the device has deviated from the first route of navigation and calculating the device's current location includes using a global positioning system. According to the teachings of the present invention, selecting a starting point for the second route of navigation includes selecting a starting point forward on a current thoroughfare on which the device is located or traveling such that the device is on the route at a time when the new route calculation is completed. In one embodiment, selecting a starting point for the second route can include a starting point located at an end of a current thoroughfare on which the device is traveling.

In one method embodiment of the present invention, the device operates on data indicative of a set of travel habits of the device on each of the plurality of types of thoroughfares and stores the travel habit data in the memory. In one embodiment of the present invention, the travel habit data includes data relating to the thoroughfare classification, the speed classification of the thoroughfare, the time of day, and the historical travel speed of the device on the particular thoroughfare. In the invention, the device regularly calculates the device's current position. The display continuously displays the device's position and uses audio and/or visual instructions to navigate to the starting point of the new route calculation as well as to navigate along the new route.

According to the teachings of the present invention, and as used herein, the device travel speed includes an estimated device travel speed, a learned device travel speed, and a current device travel speed. As used herein, a learned device travel speed includes travel speed data that is obtained from the data indicative of a set of travel habits of the device on each of the plurality of types of thoroughfares. As used herein, an estimated travel speed includes travel speed data that is obtained from data indicative of a thoroughfare's classification type such as an interstate, city street, residential road and the like, and includes travel speed data that is obtained from the data indicative of a thoroughfare's speed classification such as a 25 mph, 55 mph, 75 mph or other roadway speed class on each of the plurality of types of thoroughfares. In one embodiment according to the teachings of the present invention, calculating the device's travel speed includes using a device travel speed which is the greater of the device's current travel speed and the device's learned travel speed or estimated travel speed.

In one method embodiment, in order to perform the new route calculation, the device calculates a length of a thoroughfare on which the device is currently traveling and calculates the device's travel speed to calculate bow far the device will travel on the current thoroughfare before a route calculation can be completed in order to adjust the starting point.

According to the teachings of the present invention, the device of the present invention includes a portable electronic navigational aid device. In one embodiment, the portable electronic navigation aid device includes a portable vehicle, or automobile navigation device. In one embodiment, the portable electronic navigational aid device includes a personal digital assistant (PDA). In one embodiment, the portable electronic navigational aid device includes a wireless communications device.

Another method embodiment of the present invention includes an electronic navigational aid device with route calculation capabilities. As described above the electronic components include a processor and a memory connected to the processor. In this embodiment, the memory has resident cartographic data and a route stored therein to navigate the device from a beginning position to a desired destination. As before, the cartographic data including data indicative of thoroughfares of a plurality of types. A display is connected to the processor and capable of displaying the cartographic data, the route to the desired destination, and the device's position. The device processes travel along the route and provides the device's location data to the display. In one embodiment, the device further provides audio and visual cues to aid navigation along the route.

In the invention, the method includes recognizing when the device has deviated from the route and calculating a new route to navigate the device to the desired destination. The method includes adjusting a starting point for the new route calculation to a location forward along a current thoroughfare on which the device is traveling. In calculating the new route the device calculates the device's travel speed to calculate how far the device will travel on the current thoroughfare before a the new route calculation can be completed. In one embodiment, in calculating the new route the device calculates a distance from the device's current position to the desired destination to estimate a first route calculation time. The device then uses a travel speed and the first route calculation time to set the starting point for the new route calculation.

According to the teachings of the present invention, if the device is not determined to be on the new route after an actual first route calculation time then the device uses a second route calculation time and the device's travel velocity to set a new starting point, on the current thoroughfare on which the device is traveling, for another new route calculation. In one embodiment, the second route calculation time is equal to or greater than an actual first route calculation time.

In one embodiment of the present invention, the starting point is set at the end of the current thoroughfare on which the device is traveling. However, as will be understood by one of ordinary skill in the art upon reading this disclosure, there will be instances for which setting the starting point at the end of the current thoroughfare will not adequately set the starting point at a location forward of the device based on the device's travel speed and the necessary route calculation time. In those instances, the device of the present invention uses a set of criteria to analyze adjacency information and determine a straightest path in order to adjust the starting point for the new route calculation to, or sufficiently forward of, a location at which the device is likely to be at the end of the route calculation time, such that the device in on the route at a time when the new route calculation is completed. As used herein, the term adjacency information, or adjacencies, is intended to include any thoroughfare which intersects the current thoroughfare on which the device is traveling. Every place two thoroughfares intersect is termed a node. Thus, every node on a given thoroughfare connects that thoroughfare to an adjacency, or adjacent thoroughfare.

Figure 7:
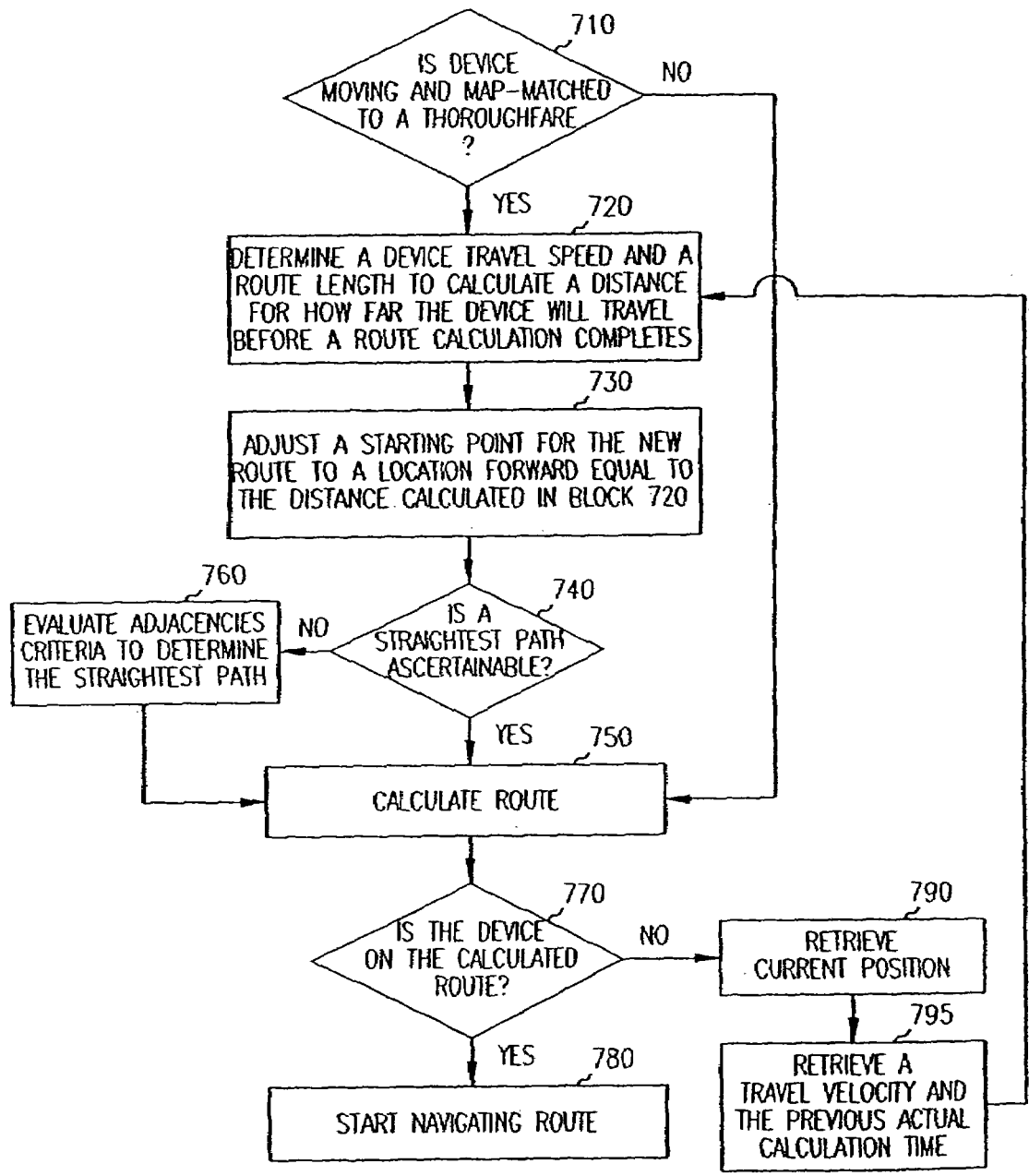
FIG. 7 is a flow diagram of another embodiment of a navigation aid method according to the teachings of the present invention.

FIG. 7 is a flow diagram of another embodiment of a navigation aid method according to the teachings of the present invention. The navigation aid method includes a method for performing a route calculation within a navigation device or navigation system such as described and explained in detail above in connection with FIGS. 4A, 4B, and 5. And, as described above, a processor is used for processing signals which include input data from user input devices, e.g. keypads or other inputs, GPS signals from GPS device/system components, and data received from I/O ports in order to perform the methods described herein.

As shown in FIG. 7, the navigation aid method for performing a route calculation includes determining whether the navigation device is moving and cartographically- or map-matched to one of a plurality of thoroughfares in block 710. In one embodiment as used herein, cartographically- or map-matched is intended to imply determining whether the device is located on a thoroughfare. In one embodiment, determining whether the navigation device is moving and cartographically- or map-matched to one of a plurality of thoroughfares includes using a GPS. According to the method, if the device is not cartographically- or map-matched to a thoroughfare then the method determines the thoroughfare on which the device is most likely to be located. As one of ordinary skill in the art will understand upon reading this disclosure, the method includes retrieving a current position of the navigation device, cartographic data for a plurality of thoroughfares in a network, and data for a desired destination.

If the device is not moving, then once the current position of the navigation device is determined the method proceeds to block 750 and proceeds to calculate a route using a current position of the navigational device as a starting point for the route calculation.

On the other hand, if the navigation device is moving, the method proceeds to block 720 where the method determines a travel speed or velocity of the navigation device and determines a route calculation time for providing a route from the current geographic position of the navigation device to a desired destination. In one embodiment, the method estimates a route calculation time for providing a route from the current geographic position of the navigation device to a desired destination. The method in block 720 for determining a travel speed or velocity of the navigation device and determining a route calculation time includes that which has been described above in connection with FIG. 6. The method in block 720 includes using this information to calculate a distance predicting how far the navigation device will travel, along a thoroughfare on which the navigation device is moving, within the determined route calculation time such that the device is on the route at a time when the new route calculation is completed.

In block 730, the method adjusts a starting point for the new route calculation to a location forward along a current thoroughfare on which the device is traveling. In one embodiment, according to the teachings of the present invention, the method adjusts the starting point for the new route calculation forward along the current thoroughfare on which the device is traveling a distance equal to the distance calculated in block 720. In one embodiment, the method adjusts the starting point for the new route calculation forward along to the end of the current thoroughfare on which the device is traveling.

In block 740 the method includes determining whether a straightest path along the current thoroughfare on which the device is traveling is ascertainable in order to adjust the location of the starting point forward of the device. As one of ordinary skill in the art will understand upon reading this disclosure, the current thoroughfare on which the device is traveling can be approaching a node or intersection of streets such that there are a number of adjacencies approaching in the direction of travel. If a straightest path along the current thoroughfare on which the device is traveling is ascertainable in order to adjust the location of the starting point forward of the device such that the device will be on the route at a time when the new route calculation is completed, then the method proceeds to block 750 and calculates a new route using a starting point location which will be at or forward of the device at a time when the new route calculation completes.

However, in some instances where the device is approaching a node or intersection of streets, such that there are a number of adjacencies approaching in the direction of travel, a straightest path along the current thoroughfare on which the device is traveling is not immediately ascertainable. Therefore, simply adjusting the starting point for the new route calculation forward, even to the end of the current thoroughfare, will not suffice or does not provide an adequate distance, based on the travel speed of navigation device and the determined new route calculation time, such that the location of the starting point will be at or forward of the device at the time the new route calculation completes.

When the straightest path is not immediately ascertainable, the method proceeds to block 760 where the method evaluates a set of adjacency criteria to determine a straightest path and locate the starting point for the new route calculation somewhere along a chosen adjacency such that the starting point for the new route calculation will be at or forward of the device at a time when the new route calculation completes. According to the teachings of the present invention, the set of adjacency criteria includes, but is not limited to, the degree of turn angles between the thoroughfare on which the device is located and adjacent thoroughfares connected thereto by a node, thoroughfare names, thoroughfare classifications, speed classification of the thoroughfares, and other criteria of the like.

As stated, as used herein, the term adjacency information, or adjacencies, is intended to include any thoroughfare which intersects the current thoroughfare on which the device is traveling. Every place two roads intersect is termed a node. Thus, every node on a given thoroughfare connects that thoroughfare to an adjacency, or adjacent thoroughfare. Once the straightest path along the current thoroughfare on which the device is traveling is ascertainable in order to adjust the location of the starting point forward of the device, such that the device will be on the route at a time when the new route calculation is completed, then the method proceeds to block 750 where the method calculates the new route.

As shown in FIG. 7, once a new route has been calculated in block 750, the method proceeds to block 770. In block 770 the method determines whether the device location is on the calculated route. If so, the method proceeds to block 780 and begins navigating the new route, including navigating the device to the starting point for the new route. In one embodiment, the method navigates the new route using both visual and audio cues.

Alternatively, according to the teachings of the present invention, if the device location is not on the calculated route then the method proceeds to block 790 and retrieves the current position of the navigation device. Next, in block 795 the method retrieves a travel velocity for the device and additionally retrieves an actual calculation time which was required to perform the previous new route calculation.

According to the teachings of the present invention, the method then returns from block 795 to block 720 and repeats the sequence described above until a new route calculation has been completed with a starting point for the new route such that the device is on the new route at the time the new route calculation completes and eventually proceeds to block 780 to start navigating the route.

In some embodiments, the methods provided above are implemented as a computer data signal embodied in a carrier wave or propagated signal, that represents a sequence of instructions which, when executed by a processor, such as processor 410 in FIGS. 4A and 4B or processor 504 in FIG. 5, cause the processor to perform the respective method. In other embodiments, methods provided above are implemented as a set of instructions contained on a computer-accessible medium, such as memory 430 in FIGS. 4A and 4B or mass storage device 512 in FIG. 5, capable of directing a processor, such as processor 410 in FIGS. 4A and 4B or processor 504 in FIG. 5, to perform the respective method. In varying embodiments, the medium is a magnetic medium, an electronic medium, or an optical medium.

As one of ordinary skill in the art will understand upon reading this disclosure, the electronic components of device 400 shown in FIGS. 4A and 4B and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving accuracy, processor speed and ease of user interaction with a navigation device. That is, the systems, devices and methods provide for a navigational route planning device which is more efficient and accurate than current low cost systems, without requiring the more expensive system resources. The systems, devices and methods of the present invention offer an improved navigational route planning device which provide more understandable, accurate and timely route calculation capabilities.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A navigation device comprising:
   a GPS receiver for receiving satellite signals from a plurality of GPS satellites;
   memory for storing data, the data including data representative of a desired destination;
   a processor coupled with the GPS receiver and the memory and operable for calculating a current location of the navigation device as a function of the received satellite signals, for calculating a route to navigate from the current location of the navigation device to the desired destination, and for adjusting a starting point for the route calculation to an appropriate location such that the device is on the route at a time when the route calculation is completed;
   a display coupled with the processor for providing visual instructions to navigate along the route to the desired destination;
   a speaker coupled with the processor for providing audio instructions to navigate along the route to the desired destination;
   an input coupled with the processor for enabling a user of the device to enter or select the desired destination; and
   a portable handheld housing for housing the GPS receiver, the memory, the processor, the display, the speaker, and the input.

2. The navigation device as set forth in claim 1, wherein the device is operable to communicate with a remote server via a communication channel for receiving data from the remote server.

3. The navigation device as set forth in claim 2, wherein the communications channel is selected from the group consisting of a wireless communications channel, a satellite communications channel, a local area network channel, a wide-area network channel, and a virtual private network channel.

4. The navigation device as set forth in claim 1, further including a power source located within the portable handheld housing and powering the GPS receiver, the memory, the processor, the display, and the speaker.

5. A navigation device comprising:
   a GPS receiver for receiving satellite signals from a plurality of GPS satellites;
   memory for storing data, the data including data representative of a desired destination;

a processor coupled with the GPS receiver and the memory and operable for
  calculating a current location of the navigation device as a function of the received satellite signals,
  calculating a route to navigate from the calculated location of the navigation device to the desired destination,
  recognizing when the device has deviated from the calculated route utilizing the received satellite signals, and
  recalculating a new route to the desired destination in response to the recognition of the deviation;
a touch-screen display coupled with the processor for enabling a user of the device to enter or select the desired destination;
a speaker coupled with the processor for providing audio instructions to navigate along the route to the desired destination; and
a portable handheld housing for housing the GPS receiver, the memory, the processor, the display, and the speaker.

6. The navigation device as set forth in claim 5, wherein the device is adapted to adjust a starting point for at least one of the route calculations to an appropriate location such that the device is on at least one of the routes at a time when the at least one of the route calculations is completed.

7. The navigation device as set forth in claim 5, further including a power source located within the portable handheld housing and powering the GPS receiver, the memory, the processor, the display, and the speaker.

8. The navigation device as set forth in claim 5, wherein the device is operable to communicate with a remote server via a communications channel for receiving data from the remote server.

9. The navigation device as set forth in claim 8, wherein the communications channel is selected from the group consisting of a wireless communications channel, a satellite communications channel, a local area network channel, a wide-area network channel, and a virtual private network channel.

10. The navigation device as set forth in claim 5, wherein the GPS receiver includes an antenna also located within the portable handheld housing.

11. The navigation device as set forth in claim 8, wherein the communications channel is a two way communications channel and the device is operable to send data to the server and receive data from the server.

12. The navigation device as set forth in claim 6, wherein the processor is further operable to determine an elapsed calculation time for the first one of the calculated routes and adjust a starting point for the new route calculation as a function of the elapsed calculation time such that the device is on the new route at a time when the new route calculation is completed.

13. The navigation device as set forth in claim 5, wherein the memory includes cartographic data representative of the current location of the device, the desired destination, and throughfares therebetween.

* * * * *